(12) United States Patent
Narasinghanallur et al.

(10) Patent No.: US 9,886,590 B2
(45) Date of Patent: Feb. 6, 2018

(54) TECHNIQUES FOR ENFORCING APPLICATION ENVIRONMENT BASED SECURITY POLICIES USING ROLE BASED ACCESS CONTROL

(75) Inventors: Janaki Narasinghanallur, San Ramon, CA (US); Min-Hank Ho, Newark, CA (US); Thomas Keefe, Mill Valley, CA (US); Eric Sedlar, Portola Valley, CA (US); Chi Ching Chui, San Ramon, CA (US); Vikram Pesati, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 19 days.

(21) Appl. No.: 12/508,011

(22) Filed: Jul. 23, 2009

(65) Prior Publication Data
US 2011/0023082 A1 Jan. 27, 2011

(51) Int. Cl.
*H04L 29/06* (2006.01)
*G06F 21/62* (2013.01)

(52) U.S. Cl.
CPC .................. *G06F 21/6218* (2013.01)

(58) Field of Classification Search
USPC .............. 726/1–3, 4, 11, 15, 12–14
See application file for complete search history.

(56) References Cited

U.S. PATENT DOCUMENTS

| 7,530,122 | B2 | 5/2009 | Schaaf |
| 7,568,217 | B1 | 7/2009 | Prasad et al. |
| 7,568,235 | B2 | 7/2009 | Bird et al. |

(Continued)

OTHER PUBLICATIONS

Michael J. Covington, Wende Long, Srividhya Srinivasan, Anind K. Dey, Mustaque Ahamd, Gregory D. Abowd,"Securing Context-Aware Applications Using Environment Roles", College of Computing George Institute of Technology, SACMAT '01, May 3-4, 2001, ACM 1-58113-350-2/01/0005, pp. 10-20.*

(Continued)

*Primary Examiner* — Edward Zee
*Assistant Examiner* — Chi Nguy
(74) *Attorney, Agent, or Firm* — Hickman Palermo Becker Bingham LLP; Adam C. Stone

(57) ABSTRACT

An application platform examines, at runtime, various specified aspects of an application environment in which an application interacts with a user. Such examinations are made to determine a state for each of the various specified aspects. Further, the platform automatically activates particular application environment roles for the user depending on the result of the examinations. For example, an application environment role may be activated representing a particular detected mode of communication (e.g., encrypted network communications) or a particular detected manner of authentication (e.g., password authentication). Such activations are based on the detected states and specified states for the various specified aspects of the application environment. Such activations may occur in the context of an application attempting to perform an operation on an access controlled object on behalf of a user. Further, such activations may occur in the context of establishing or maintaining a user session for a user of an application.

26 Claims, 4 Drawing Sheets

(56) References Cited

U.S. PATENT DOCUMENTS

| | | | |
|---|---|---|---|
| 7,640,429 | B2 | 12/2009 | Huang et al. |
| 7,650,505 | B1 | 1/2010 | Masurkar |
| 7,650,633 | B2 | 1/2010 | Whitson |
| 7,653,936 | B2 | 1/2010 | Oberst |
| 2003/0105953 | A1* | 6/2003 | Brabson .............. H04L 63/0823 713/151 |
| 2007/0143823 | A1* | 6/2007 | Olsen et al. ...................... 726/1 |
| 2007/0189303 | A1* | 8/2007 | Sunada ...................... 370/395.5 |
| 2008/0163332 | A1* | 7/2008 | Hanson ................ G06F 21/606 726/1 |
| 2009/0271844 | A1* | 10/2009 | Zhang et al. ..................... 726/2 |
| 2010/0064340 | A1* | 3/2010 | McCorkendale ... G06F 21/6218 726/1 |

OTHER PUBLICATIONS

Subhendu Aich, Samrat Mondal, Shamik Sural and Arun Kumar Majumdar, "Role Based Access Control with Spatiotemporal Context for Mobile Applications", School of Information Technology Department of Computer Science and Engineering Indian Institute of Technology, Kharagpur, India, Transactions on Computational Science IV, Mar. 27, 2009, pp. 177-199.*

Michael J. Covington, Prahlad Fogla, Zhiyuan Zhan, and Mustaque Ahamad, "A Context-Aware Security Architecture for Emerging Application", College of Computing Georgia Institute of Technology, Proceedings of the 18th Annual Computer Security Applications Conference (ACSAC'02), pp. 1-10.*

Information Technology Industry Council, "For Information Technology—Role Based Access Control", American National Standards Institute, Inc., Feb. 3, 2004, 56 pages.

* cited by examiner

TECHNIQUES FOR ENFORCING APPLICATION ENVIRONMENT BASED SECURITY POLICIES USING ROLE BASED ACCESS CONTROL

TECHNICAL FIELD

The present invention relates generally to data processing and, more particularly, to techniques in a data processor for enforcing application environment based security policies using role based access control.

BACKGROUND

Role Based Access Control (RBAC) is a model for enforcing security policies with computers. In RBAC, users are assigned to roles and access control lists are specified in terms of roles. In RBAC, a role represents a job function within the context of a business or other organization with some associated semantics regarding the authority and responsibility conferred on the users assigned to the role. Very generally, an access control list is set of permissions associated with an object (e.g., a file or process in an operating system or a table in a relational database). An access control list specifies what operations can be performed on the object and who or what can perform those operations. For example, an access control list associated with a directory of a computer file system that stores customer invoices might specify that users assigned to the Accounting Role can read and write files stored in the directory.

By allowing access control lists to be specified in terms of roles, RBAC simplifies management of security policies. Access control lists do not need to be managed in terms of individual user identities and instead can be managed in terms of a fewer number of roles. Granting individual users permissions to perform operations on objects becomes a simplified matter of assigning users to the appropriate roles. For further description of RBAC, see e.g., "ANSI/INCITS 359-2004", an ANSI/INCITS standard dated Feb. 3, 2004, the disclosure of which is hereby incorporated by reference. A copy of the standard is available via the Internet (e.g., currently at www.incits.org).

Unfortunately, RBAC is not suited to enforcing security policies that apply to all users regardless of their identity or the roles to which they are assigned. An example of such a security policy is: social security numbers retrieved from the database must be transmitted over encrypted network connections. This security policy is an example of application environment based security policy. Enforcement of an application environment based security policy depends not on the identity or the roles of the user interacting with the application, but on the state of the environment in which the user is interacting with the application. In the example application environment based security policy, permission to read social security numbers from the database depends not on the identity or role of the user that is interacting with the database application, but on whether the network connection between the user and the database application is encrypted.

One approach to enforcing application environment based security policies using RBAC is to assign users to roles and then selectively activate the roles for users depending on the detected state of the system environment. For example, the database application could detect whether a user is connected to the application via an encrypted network link and then activate a role assigned to the user that gives the user permission to access social security numbers. However, this approach is difficult to implement from the perspective of a security administrator. For example, a security administrator would have to ensure that all possible users are assigned to the role that provides permission to access social security numbers. Furthermore, this approach would require that each application that accesses social security numbers have logic for detecting the state of the system environment and logic for mapping system environment states to the roles that are to be selectively activated.

Based on the foregoing, there is a need for a more natural framework for enforcing application environment based security policies using role based access control.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
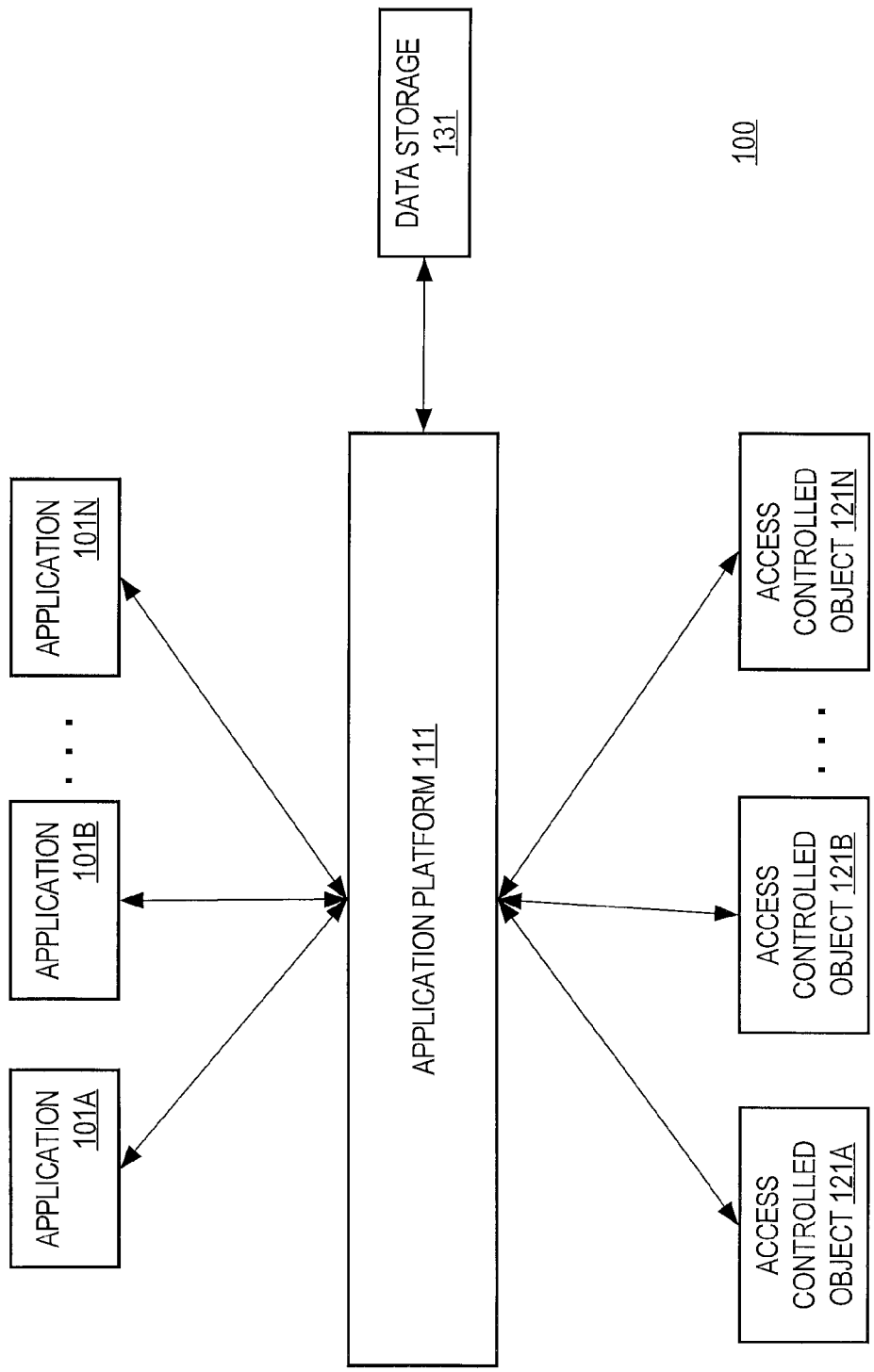
FIG. 1 is a block diagram that illustrates a multi-user system environment in which embodiments of the invention may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described in which an "application environment role" functions to grant permissions to a user based on detected states of an application environment in which the user interacts with an application. Hence, users may acquire application environment based permissions more naturally, without being assigned to roles.

An application platform ("platform") examines, at runtime, various aspects of an application environment in which an application interacts with a user. Such examinations are made to determine a state for each of the various aspects. Further, the platform automatically activates particular application environment roles for the user depending on the result of the examinations. For example, an application environment role may be activated representing a particular detected mode of communication (e.g., encrypted network communications) or a particular detected manner of authentication (e.g., password authentication). Such activations are based on the detected states and specified states for the various aspects of the application environment. Such activations may occur in the context of an application attempting to perform an operation on an access controlled object on behalf of a user. Further, such activations may occur in the context of establishing or maintaining a user session for a user of an application.

The platform provides a more natural framework for enforcing application environment based security policies because it is capable of supporting automatic activation of application environment roles for all users based on detected states of the application environments in which different applications interact with the users. The platform is able to facilitate enforcement of application environment based security policies without requiring assignments of users to roles. Furthermore, the platform is able to facilitate enforcement of such policies without requiring applications to contain logic for detecting and activating roles.

In one embodiment, for example, the platform detects a state of an aspect of an application environment in which an application interacts with a user. For example, in one embodiment, the platform detects a state of a network connection between the user and the application. The aspect of the application environment corresponds to an application environment role. The application environment role is to be activated by the platform based on determining whether the state of the aspect satisfies a specified state of the aspect. For example, in one embodiment, the platform activates an application environment role in response to determining that the network connection between the user and the application is encrypted. In response to determining that an application environment role should be activated, the platform activates the application environment role for the user such that an operation on an access controlled object, when caused by the application to be performed on behalf of the user, is successfully performed. In one embodiment, the platform activates an application environment role by adding permission data associated with the application environment role to permission data maintained by the platform that represents the set permissions currently acquired by the user.

Other aspects and advantages of the techniques will become apparent from the following detailed description in combination with the accompanying drawings, illustrating, by way of example, embodiments of the invention.

Multi-User System Environment

Embodiments of the invention are embodied in a multi-user system environment. A multi-user system environment according to an embodiment of the invention provides an application platform that examines various aspects of the application environment in which applications perform operations on access controlled objects on behalf of users. The platform also selectively activates application environment roles for users based on the examination of the various aspects of the application environment.

The term "application environment", unless otherwise indicated, refers to the computing environment, and the configuration thereof, in which a user interacts with an application. The application environment includes the computing devices, network devices, networks, and software the user uses to interact with the application. The application environment also includes how those computing devices, network devices, networks, and software are configured to facilitate the user's interaction with the application.

FIG. 1 is a block diagram that illustrates a multi-user system environment (100) in which embodiments of the invention may be implemented. The illustrated system environment (100) includes one or more applications (101A-N), which communicate through application platform (111) to perform operations on one or more access controlled objects (121A-N) on behalf of users interacting with the applications (101A-N). While in one embodiment, the multi-user system environment (100) is embodied in a single (stand-alone) computer system such as computer system (400) of FIG. 4, the multi-user system environment (100) may also be embodied in a distributed computing environment comprising many computer systems such as in a client/server system or in a three-tier client/server architecture.

Platform (111) is a software layer or intermediary between applications (101A-N) and access controlled objects (121A-N). Platform (111) provides a central point through which access to access controlled objects (121A-N) are managed. In one embodiment, platform (111) is implemented by an application server or other server that offers an Application Programming Interface (API) to expose business logic and business procedures for use by third-party applications (101A-N). Application servers are available commercially from a variety of vendors. Examples of commercially available application servers include the Oracle Application Server™ available from Oracle International Corp. of Redwood Shores, Calif., the .NET Framework™ available from Microsoft Corp. of Redmond, Wash., and the WebSphere Application Server™ available from IBM of Armonk, N.Y. In embodiments in which platform (111) is implemented by an application server, applications (101A-N) use an API offered by the application server to perform database operations on access controlled database objects (121A-N) managed by a database management system (DBMS). In such embodiments, platform (111) may also maintain a connection to the DBMS and database session data on behalf of a user of an application (101A-N).

In another embodiment, platform (111) is implemented by a kernel or operating system which manages low-level aspects of a computing device, including managing execution of applications (101A-N), memory management, file system input and output (I/O), device I/O, and network communications. Examples of commercially available operating systems include the Microsoft Windows™ family of operating systems available from Microsoft Corp. of Redmond, Wash. In embodiments in which platform (111) is implemented by a kernel or operating system, applications (101A-N) use an API provided by the kernel or operating system to perform low-level operations on access controlled objects (121A-N) managed by the operating system such as, for example, file system files and directories.

While in preferred embodiments, platform (111) is implemented by an application server or an operating system, it should be understood that embodiments of the invention are not limited to being implemented in an application server or an operating system and the embodiments may be implemented in virtually any computer system that implements role-based access control.

Applications (101A-N) are software applications that each include one or more sequences of instructions that are executable by one or more processors. For example, applications (101A-N) are programs that are executable on a computer system such as the system illustrated in FIG. 4. There is no necessary relationship or similarity between applications (101A-N), unless otherwise described herein. Each of the applications (101A-N) is capable of receiving requests or commands from users which results in the application attempting to perform an operation on an access controlled object (121A-N) in an attempt to fulfill the users' requests. The type of operations attempted by applications (101A-N) depends on what implements platform (111). For example, within an operating system, operations might include read, write, and execute; within an application server, operations might include database commands such as retrieve, insert, delete, and update. An application (101A-N) can be a proxy for a user of the application in that the application attempts to perform an operation on an access controlled object (121A-N) while assuming, perhaps only for the duration of the operation, any roles acquired by the user.

Access controlled objects (121A-N) represent any object associated with an access control list and accessible by an operation initiated by an application (101A-N). For example, within an operating system, access controlled objects (121A-N) may include files and directories. Within a relational database management system, access controlled objects (121A-N) include database storage objects such as tables, rows, columns, and cells. There is no necessary relationship or similarity between access controlled objects (121A-N), unless otherwise described herein.

Figure 4:
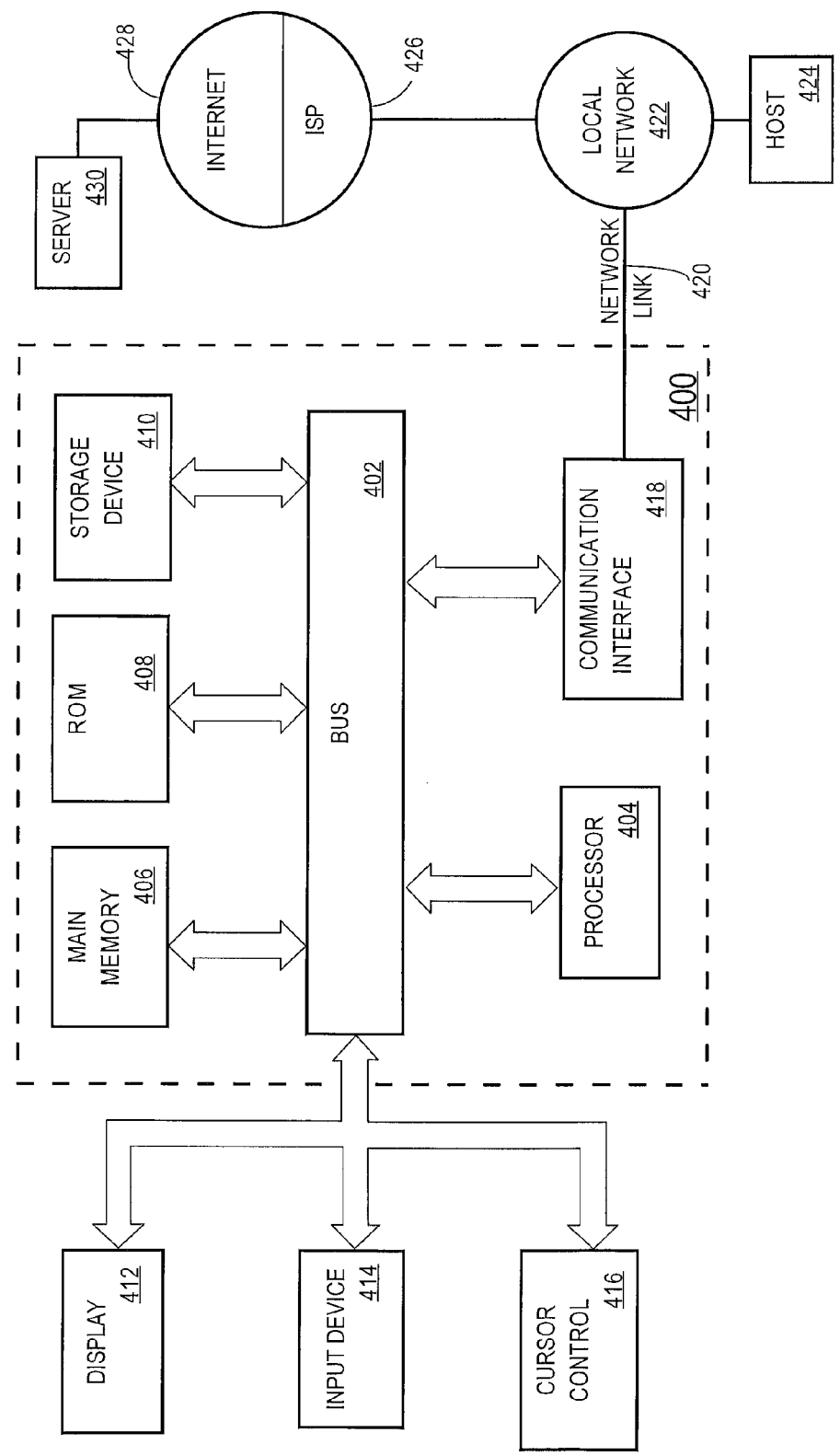
FIG. 4 is a block diagram that illustrates a computer system upon which an embodiment of the invention may be implemented.

Applications (101A-N) and access controlled objects (121A-N) may be embodied within the same computer system such as the computer system illustrated in FIG. 4. Alternatively, applications (101A-N) and access controlled objects (121A-N) may be embodied in one or more separate computer systems connected via a communication network (not shown). Such a communication network may contain any number of network infrastructure elements including routers, switches, gateways, etc. For example, the communication network may be the public Internet or a private LAN. Further, users may interact with applications (101A-N) through one or more client computer systems (not shown) which are communicatively coupled to the applications (101A-N) via a communication network.

Application Platform

Application platform (111) operates or executes to provide the logic for enforcing application environment based security policies as described herein. The logic of platform (111) may be implemented in various embodiments using one or more computers, one or more application-specific integrated circuits (ASICs) or other digital electronic logic, one or more computing programs, modules, objects, methods, or other software elements. For example, in one embodiment, platform (111) comprises a special-purpose computer having logic configured to implement the respective elements and functions of platform (111).

Platform (111) may be configured as integral to an application requesting to perform an operation on an access controlled object (121A-N), such as applications (101A-N), or as a separate module independent of any requesting application. Platform (111) may be configured on the client-side of a network or on the server-side of a network. For example, platform (111) may be configured as a plug-in module to a client application, an application server, or an operating system.

The general functionality provided by platform (111) is (1) detecting states of various aspects of an application environment in which an application interacts with a user, and (2) activation of application environment roles based on the detected states and specified states of the various aspects of the application environment. The functions and capabilities of the platform (111) are described in more detail throughout this description.

Multi-user system environment (100) may also include a volatile or non-volatile data storage (131) for storing various information used by platform (111) in enforcing application environment based security policies. For example, data storage (111) may be database or file system storing application environment role information (202) (FIG. 2) and providing access thereto to platform (111).

Each application (101A-N) may communicate with platform (111) independently of the other applications. Further, execution of the functionality of platform (111) may be transparent to users of applications (101A-N) and to access controlled objects (121A-N).

Application Environment Role Information

Figure 2:
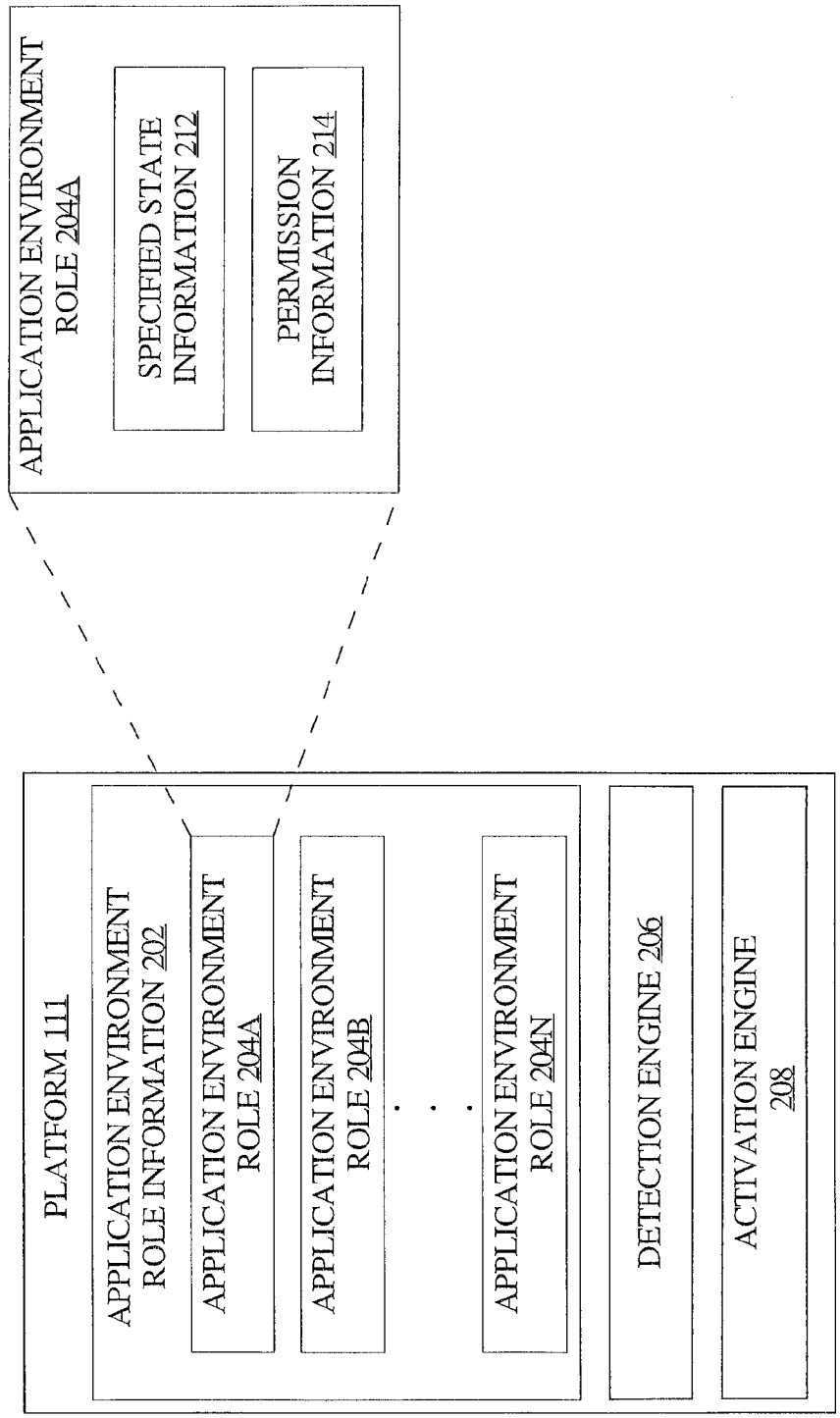
FIG. 2 is a block-diagram that illustrates application environment role information, according to an embodiment of the invention.

FIG. 2 is a block-diagram that illustrates application environment role information used by an application platform, such as application platform (111), according to an embodiment of the invention. A platform (111) accesses and retrieves application environment role information (202) from data storage (131) and, therefore, at times includes application environment role information (202) in local volatile memory. Platform (111) includes detection engine (206) and activation engine (208). Detection engine (206) operates or executes to provide the logic for detecting states of various aspects of an application environment in which applications interacts with users. Activation engine (206) operates or executes to provide the logic for activating application environment roles based on the detected and specified states of the various aspects of the application environment. The logic of detection engine (206) and activation engine (208) may be implemented in various embodiments using a computer, one or more application-specific integrated circuits (ASICs) or other digital electronic logic, one or more computing programs, modules, objects, methods, or other software elements.

The application environment role information (202) represents specified states of various "aspects" of an application environment in which applications interact with users and permissions to be acquired by users when they interact with an application when the application environment is in those specified states. For example, the aspects of the application environment may correspond to the mode and manner, and properties thereof, of how the user is interacting with the application and where or when the mode or manner is used by the user to interact with the application. Aspects of the application environment may be identified by a security administrator responsible for implementing application environment based security policies. Specified state information about the identified aspects may be stored in a repository, such as data storage (131), which is accessible to platform (111). As described further below, detection engine (206) of platform (111) uses such specified state information to determine which aspects of an application environment are to be examined and which application environment roles should be activated for a user.

Application Environment Roles

Application environment role information (202) includes one or more application environment roles (204A-N). Generally, application environment roles (204A-N) represent specified states of various aspects of an application environment in which applications interact with users. Application environment roles (204A-N) represent relationships between the specified states and permissions that are granted to users who interact with an application when the application environment is in those specified states. Application environment roles (204A-N) describe, generally, rules or directions for determining whether the application environment is in a specified state. For example, a rule may be associated with the detection of what form of encryption is used for a network connection between the user and an application, or what manner of authentication was used to authenticate the user when the network connection was established. In addition to rules regarding what aspects of an application environment to examine and how to detect what state those aspects are in, in one embodiment, application environment roles (204A-N) include program code to perform the necessary examination and detection. For example, code may be provided to inspect a network connection between the user and the application to determine whether the network connection is encrypted, and if so, what form of encryption is used to encrypt communications over the network connection.

Platform (111) uses application environment role information (202) to make determinations regarding (a) what aspects of the application environment to detect, and (b) whether the detected states of the aspects are such that one or more application environment roles should be activated. The form and data container structure in which application environment role information (202) is stored in data storage (131) is a detail that may vary from implementation to implementation. For non-limiting examples, application environment role information (202) may be stored in one or more relational data tables or in one or more files.

Each application environment role (204A-N) includes specified state information (212) regarding an aspect of an application environment and permission information (214).

Specified State Information

Enforcement of an application environment security policy depends on the state of the application environment in which an application interacts with users. For example, enforcement of the security policy requiring that all social security numbers be transmitted over encrypted network connections depends on the state of the network connection between the user and the application transmitting the social security numbers to the user. Further, enforcement of an application environment security policy depends on being able to detect the state of an aspect of the application environment that is relevant to the security policy. For example, enforcement of the social security number policy requires the ability to detect whether the network connection between the user and the application is encrypted. Specified state information (212) includes (a) information that specifies what aspects of the application environment to detect the state of, and (b) information that specifies or describes how to detect the state of those aspects. In the context of the social security numbers example, specified state information may include information that specifies network connection endpoint information to be obtained and code for invoking an API to obtain the information.

Specified state information (212) includes information that specifies what state the corresponding aspect of the application environment must be in for the corresponding application environment role to be activated for a user. Detection engine (206) of platform (111) uses specified state information (212) to determine whether a detected state of an aspect of an application environment satisfies an application environment based security policy represented by the corresponding application environment role. If the detected state does satisfy the security policy according to the specified state information (212), then detection engine (206) requests activation engine (208) to activate, for the user, the corresponding application environment role.

For example, specified state information may indicate that Transport Layer Security (TLS) is required for the network connection between the user and the application. TLS is a well-known cryptographic protocol that provides security and data integrity for connections over public networks such as the Internet. Detection engine (206) uses specified state information (212) to determine whether a network connection between the user and the application is using Transport Layer Security. If the network connection is using TLS, then detection engine (206) requests activation engine (208) to activate, for the user, the application environment role associated with the specified state information.

Some level of application environment information (202), such as application environment role 204A or specified state information (212), may include directions, routines, calls or the like, to detect a state of an aspect of an application environment and to determine whether a detected state of an aspect of an application environment satisfies specified state information for an application environment role. Alternatively, in one embodiment, detection engine (206) comprises "hard-coded" logic for detecting a state of an aspect of an application environment and determining, based on the detected state, whether an application environment role is to be activated.

For example, application environment role (204A) may include a routine, or a reference thereto, that detects the manner of authenticating the user of an application. Detection engine (206) calls the referenced routine to detect what particular manner of authentication (i.e., a detected state) was used to authenticate the user (i.e., an aspect of an application environment in which the user interacts with an application). Based on the detected state, detection engine (206) determines whether the application environment role should be activated. Application environment role (204A) may include an additional routine, or a sub-routine, that determines whether the detected state satisfies the specified state associated with the application environment role. Such determinations may involve comparing data stored in a memory of a computing device or other executable logic suitable for determining whether a detected state satisfies a specified state associated with an application environment role.

Permission Information

Activation engine (208) of platform (111) uses permission information (214) to activate an application environment role for a user. Permission information (214) for an application environment role may be accessed by activation engine (208), such as from data storage (131), or passed to activation engine (208) from detection engine (206) in response to detection engine (206) determining that an application environment role should be activated. Generally, permission information (214) comprises data necessary to grant the permissions represented by or assigned to an application environment role such that an operation on an access controlled object, when caused to be performed by an application on behalf of a user, is performed with the permissions associated the application environment role.

Detection engine (206) determines which, if any, application environment roles (204A-N) should be activated and activation engine (208) grants application environment based permissions to a user by activating those application environment roles that detection engine (206) determines should be activated. For example, in response to detection engine (206) determining that the user was authenticated using a username and password, activation engine (208) activates an application environment role associated with permissions that are to be granted when a user authenticates using a username and password. In one embodiment, activation engine (208) activates an application environment role for a user by modifying a set of roles or permissions maintained in a user session such as a logon session maintained by an operating system or a database session maintained by an application server. In another embodiment, activation engine (208) activates an application environment role for a user by modifying permission information maintained by an application process or thread that is executing on behalf of the user.

Access Control Lists

In addition to permission information (214) being associated with an application environment role, such permission information, or a portion thereof, may be added to an access control list associated with an access controlled object. As mentioned previously, an access control list is set of permissions associated with an object (e.g., a file or process in an operating system or a table in a relational database). An access control list specifies what operations can be performed on the object and who or what can perform those operations. In addition, with the application environment roles of the present invention, an access control list may specify what operations can be performed on an access controlled object and in what application environment those operations can be performed.

For example, consider the following examples of application environment based security policies governing a payroll application that accesses payroll data stored in a database:
A user must accesses the payroll application from inside a firewall to read any payroll data.
An employee can read his or her own payroll data only if authenticated via a username and password.
An employee can update payroll data only if connected to the payroll application over an encrypted network link.

To implement these security policies, three application environment roles could be created: a "Firewall" application environment role that represents an application environment in which a user connects to an application from inside a network firewall, a "password authentication" application environment role that represents an application environment in which a user is authenticated by a username and password, and a "network encryption" application environment role that represents an application environment in which a user interacts with an application over an encrypted network link. Further, a user role "Employee" could be created and users that are employees assigned to the Employee role.

An access control list specifies a permission in terms of a subject and an operation. A permission may be specified in terms of an operation a subject is allowed to perform (i.e., an allow permission) and in terms of an operation the subject is not allowed to perform (i.e., a deny permission). In one embodiment, the subject of a permission in an access control list is specified in terms of application environment role or permission information associated with the application environment role. For example, to implement the example application environment based security policies above, an access control list associated with the payroll data may include permission entries indicating the firewall, password authentication, or network encryption application environment roles, or permissions assigned thereto.

With the ability to specify access control lists in terms of application environment roles, or permissions assigned thereto, application environment based security policies can be established in a declarative manner, as opposed to developing and deploying custom logic for enforcing such policies. Further, applications may be developed without concern about how application environment based security policies are enforced.

Figure 3:
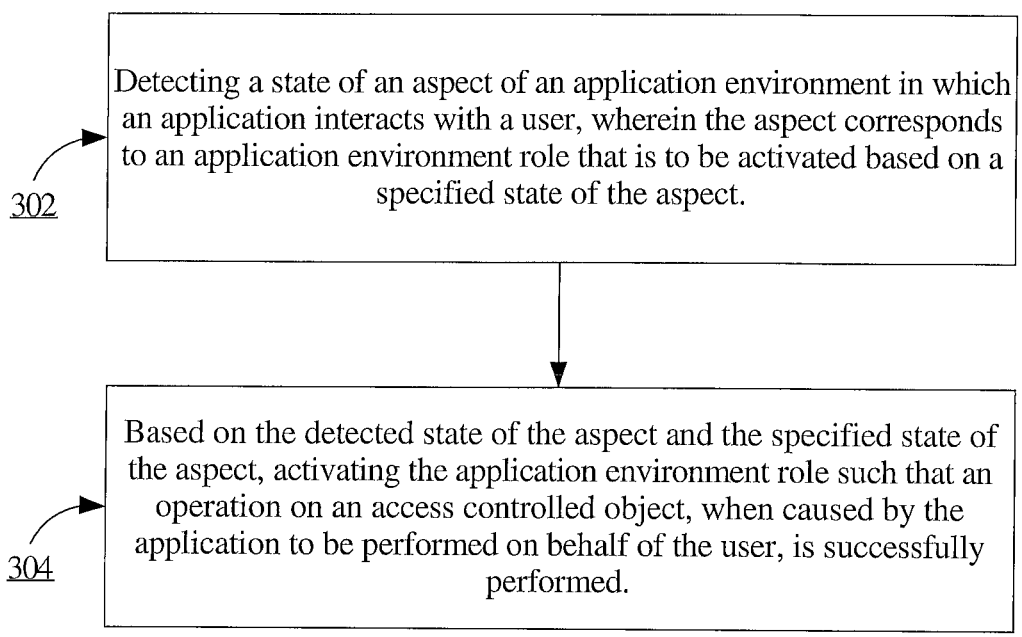
FIG. 3 is a flow diagram that illustrates a process for enforcing application environment based security policies using role based access control, according to an embodiment of the invention.

Process for Enforcing Application Environment Based Security Policies Using Role-Based Access Control FIG. 3 is a flow diagram that illustrates an automated process for enforcing application environment based security policies using role-based access control. The computer-implemented actions associated with the process of FIG. 3 are executed by one or more processors of a computer system, such as computer system 400 of FIG. 4. The instructions that are executed by the processors(s) are part of a computer program, such as the platform (111) of FIG. 2.

At block 302, a state of an aspect of an application environment in which an application interacts with a user is detected by examining the aspect. The aspect that is examined corresponds to an application environment role that is to be activated based on a specified state of the aspect. For example, in one embodiment, detection engine (208) of platform (111) examines a network connection between a user and an application to detect a state of the network connection. Such examination may involve obtaining connection endpoint information about a network connection established between a client and a server that hosts the application. In one embodiment, detecting a state of the network connection includes detecting a form of encryption used to encrypt communications over the network connection. Example forms of encryption include Transport Layer Security (TLS) or Secure Sockets Layer (SSL).

Other aspects of a network connection between a user and an application may be detected in step 302. For example, in one embodiment, detecting a state of a network connection between the user and the application includes detecting a network source of the network connection. The network source may be identified by a network address such as an Internet Protocol (IP) address. Identifying the network source of a network connection is useful to enforcement of application environment based security policies. For example, organizations may desire to grant permissions to users based on whether they are accessing network enabled applications from inside a firewall or via Virtual Private Network (VPN). Accordingly, in one embodiment, detecting a network source of the network connection includes determining whether the network connection originates from inside a network firewall. In another embodiment, detecting a state of a network connection between the user and the application includes detecting whether the network connection transits a virtual private network (VPN).

The state of aspects other than state of a network connection may be detected at block 302. In one embodiment, detecting a state of an aspect of an application environment in which an application interacts with a user includes detecting a manner of authenticating the user. For example, a user may logon to an operating system shell or session using a username and password. As another example, a user may authenticate with a web application executing on application server using one of a variety of single sign-on mechanisms such as a Kerberos, smart card, or one-time password based mechanism. A user may also use a biometric mechanism for authentication such as a fingerprint scan or a retinal scan. Embodiments of the invention are not limited to any particular manner of authenticating a user and detectable manner of authenticating a user may be used.

Detection engine (206) of platform (111) may perform the detection of block 302 at virtually any time. In one embodiment, detection engine (206) detects states of aspects of an application environment in response to an application requesting a connection to a database system. For example, an application may request a connection to a database system from an application server platform to perform a database operation on behalf of a user of the application.

In one embodiment, detection engine (206) detects states of aspects of an application environment in response to an application server platform establishing a database session for the user. For example, an application server platform may establish a database session for a user when an application requests a connection to a database system on behalf of a user.

In one embodiment, detection engine (206) detects states of aspects of an application environment in response to an operating system establishing a logon session for a user. For example, an operating system may establish a logon session in conjunction with establishment of an operating system shell such as a command line interface shell or a graphical user interface shell.

In one embodiment, detection engine (206) detects a state of a specified aspect of an application environment in which an application interacts with a user in response to the application attempting to perform the operation on the access controlled object on behalf of the user. For example, a detection engine (206) in an operating system may perform the detection at block 302 in response to an application executing within the operating system requesting the operating system to perform an operating system operation on behalf of a logged on user. Such operating system operation might include reading a file or executing a process. As another example, a detection engine (206) in an application server platform may perform the detection at block 302 in response to an application executing on the application server platform requesting to perform, on behalf of a user of the application, a database operation on an access controlled database object such as a database table, row, or column.

At block 304, based on detection engine (206) determining that the state of the aspect of the application environment as detected at block 302 satisfies the specified state of the aspect as specified in the application environment role that corresponds to the aspect, activation engine (208) activates the application environment role such that an operation on an access controlled object, when caused by the application to be performed on behalf of the user, is successfully performed. Activation engine (208) may activate the application environment role using any appropriate method that causes the operation on the access controlled object to be performed with the permission(s) represented by the application environment role or the permission(s) assigned to the application environment role. Such methods may include, for example, configuring role or permission data maintained for user session such as a logon session or a database session. Other activation methods may include configuring role or permission information maintained for an application process or thread executing the operation on the access controlled object on behalf of a user.

In one embodiment, successful performance of an operation on an access controlled object that is associated with an access control list is achieved by activating an application environment role that is required by the access control list to be activated in order to successfully perform the operation. For example, an access control list associated with a database table may specify that a particular application environment role is required to read data from the table. Activation engine (208) may cause successful performance of an operation attempting to read data from the table, by activating the particular application environment role specified in the access control list associated with the table.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computer systems, desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for enforcing application environment based security policies using role based access control, the method comprising:

examining an aspect of an application environment in which an application interacts with a user to determine whether the application environment aspect is in a particular state;

based on determining the application environment aspect is in the particular state, activating an application environment role in a session established at a server;

wherein the user is not assigned to the application environment role;

sending a request to the server on behalf of the user to perform an operation on an access controlled object;

based on the application environment role being activated in the session, the server allowing performance of the operation on the access controlled object;

wherein the application environment role is associated with an access control list;

wherein the access control list is associated with the access controlled object;

wherein the access control list specifies that the application environment role has permission to perform the operation on the access controlled object; and wherein the server allowing the performance of the operation on the access controlled object is further based on the access control list specifying that the application environment role has permission to perform the operation on the access controlled object.

2. The computer-implemented method of claim 1, wherein the operation of examining an aspect of an application environment in which an application interacts with the user includes examining a network connection between the user and the application.

3. The computer-implemented method of claim 2, wherein the operation of examining a network connection between user and the application includes detecting a form of encryption used to encrypt communications over the network connection.

4. The computer-implemented method of claim 3, wherein the form of encryption is selected from the group consisting of Transport Layer Security (TSL) and Secure Sockets Layer (SSL).

5. The computer-implemented method of claim 2, wherein the operation of examining a network connection between the user and the application includes detecting a network source of the network connection.

6. The computer-implemented method of claim 5, wherein detecting a network source of the network connection includes determining whether the network source of the network connection is inside a network firewall.

7. The computer-implemented method of claim 2, wherein the operation of examining a network connection between the user and the application includes detecting whether the network connection transits a virtual private network (VPN).

8. The computer-implemented method of claim 1, wherein the operation of examining an aspect of an application environment in which an application interacts with the user includes detecting a manner of authenticating the user.

9. The computer-implemented method of claim 8, wherein the manner of authenticating the user comprises username and password authentication.

10. The computer-implemented method of claim 1, wherein the operation of examining an aspect of an application environment in which an application interacts with the user is performed in response to the application establishing a network connection to a server.

11. The computer-implemented method of claim 1, wherein the session comprises a database session maintained for the user, and wherein the operation of examining an aspect of an application environment in which an application interacts with the user is performed in response to establishing the database session for the user.

12. The computer-implemented method of claim 1, wherein the access controlled object comprises a database table, a database column, or a database row.

13. The method of claim 1, further comprising:
sending a second request to the server on behalf of the user to perform a second operation on an access controlled object; and
based on the application environment role being activated in the session, the server allowing performance of the second operation on the access controlled object.

14. A non-transitory computer-readable medium that stores instructions which, when executed by one or more processors, cause performance of operations comprising:
examining an aspect of an application environment in which an application interacts with a user to determine whether the application environment aspect is in a particular state;
based on determining the application environment aspect is in the particular state, activating an application environment role in a session established at a server;
wherein the user is not assigned to the application environment role;
sending a request to the server on behalf of the user to perform an operation on an access controlled object; and
based on the application environment role being activated in the session, the server allowing performance of the operation on the access controlled object;
wherein the application environment role is associated with an access control list;
wherein the access control list is associated with the access controlled object;
wherein the access control list specifies that the application environment role has permission to perform the operation on the access controlled object; and
wherein the server allowing the performance of the operation on the access controlled object is further based on the access control list specifying that the application environment role has permission to perform the operation on the access controlled object.

15. The non-transitory computer-readable medium of claim 14, wherein the operation of examining an aspect of an application environment in which an application interacts with the user includes examining a network connection between the user and the application.

16. The non-transitory computer-readable medium of claim 15, wherein the operation of examining a network connection between the user and the application includes detecting a form of encryption used to encrypt communications over the network connection.

17. The non-transitory computer-readable medium of claim 16, wherein the form of encryption is selected from the group consisting of Transport Layer Security (TSL) and Secure Sockets Layer (SSL).

18. The non-transitory computer-readable medium of claim 15, wherein the operation of examining a network connection between the user and the application includes detecting a network source of the network connection.

19. The non-transitory computer-readable medium of claim 18, wherein detecting a network source of the network connection includes determining whether the network source of the network connection is inside a network firewall.

20. The non-transitory computer-readable medium of claim 15, wherein the operation of examining a network connection between the user and the application includes detecting whether the network connection transits a virtual private network (VPN).

21. The non-transitory computer-readable medium of claim 14, wherein the operation of examining an aspect of an application environment in which an application interacts with the user includes detecting a manner of authenticating the user.

22. The non-transitory computer-readable medium of claim 21, wherein the manner of authenticating the user comprises username and password authentication.

23. The non-transitory computer-readable medium of claim 14, wherein the operation of examining an aspect of an application environment in which an application interacts with the user is performed in response to the application establishing a network connection to the server.

24. The non-transitory computer-readable medium of claim 14, wherein the session comprises a database session maintained for the user, and wherein the operation of examining an aspect of an application environment in which an application interacts with the user is performed in response to establishing the database session for the user.

25. The non-transitory computer-readable medium of claim 14, wherein the access controlled object comprises a database table, a database column, or a database row.

26. The non-transitory computer-readable medium of claim 14, the operations further comprising:
  sending a second request to the server on behalf of the user to perform a second operation on an access controlled object; and
  based on the application environment role being activated in the session, the server allowing performance of the second operation on the access controlled object.

\* \* \* \* \*

UNITED STATES PATENT AND TRADEMARK OFFICE
CERTIFICATE OF CORRECTION

PATENT NO. : 9,886,590 B2
APPLICATION NO. : 12/508011
DATED : February 6, 2018
INVENTOR(S) : Janaki Narasinghanallur et al.

It is certified that error appears in the above-identified patent and that said Letters Patent is hereby corrected as shown below:

Column 15, Line 24:
Claim 4: Delete "(TSL)" and insert --(TLS)--.

Column 16, Line 44:
Claim 17: Delete "(TSL)" and insert --(TLS)--.

Signed and Sealed this
Twenty-ninth Day of May, 2018

Andrei Iancu
*Director of the United States Patent and Trademark Office*